Patented Mar. 8, 1932

1,848,227

UNITED STATES PATENT OFFICE

ARNOLD SHEPHERDSON AND SIDNEY THORNLEY, OF BLACKLEY, MANCHESTER, ENGLAND, ASSIGNORS TO BRITISH DYESTUFFS CORPORATION LIMITED, OF MANCHESTER, ENGLAND

MANUFACTURE AND USE OF VAT DYES OF THE BENZANTHRONE SERIES

No Drawing. Application filed July 28, 1927, Serial No. 209,173, and in Great Britain August 26, 1926. Renewed September 17, 1931.

This invention relates to a new method of obtaining valuable grey and black vat dyes. In a patent to Kunz 1,464,079, August 7, 1923, there is described the production of certain vat dyes by acting upon dibenzanthrone with hydroxylamine in the presence of sulphuric acid and ferrous sulphate.

We have now made the surprising discovery that by acting upon benzanthrone and its unsulphonated derivatives with hydroxylamine or salts thereof under similar conditions, and fusing the intermediate product thus obtained with caustic alkali, new vat dyes are also obtained.

The following examples illustrate, without limiting, our invention, the parts being by weight:—

Example I 20 parts of benzanthrone are dissolved with stirring in 400 parts of sulphuric acid of 66° Bé. 24 parts of ferrous sulphate crystals are now added, followed, after cooling, by the gradual addition of 15 parts of hydroxylamine hydrochloride. The whole is now heated to 150° C. and maintained at this temperature for 4 hours. The ferrous sulphate catalyzes and hastens the actions desired. These actions will take place in its absence but a longer period of heating is required. After the heating operation, the reaction mixture is cooled and poured into 1325 parts of ice and water, the whole being then stirred for one hour. The precipitated product is separated by filtration, extracted three times with 1000 parts of boiling water, and dried.

10 parts of the dried residue are gradually added at 180° C. to 100 parts of stirred molten caustic potash. The temperature is slowly raised to 240° C. The melt is maintained at 240° C. for 1 hour. The cooled melt is extracted with 1000 parts of water, heated to boiling, and oxidized with a current of air. The dyestuff is filtered off, boiled with dilute hydrochloric acid, washed with water, and dried. It dyes cotton from a hydrosulphite vat in bluish-grey to bluish-black shades. It dissolves in pyridine giving a bluish green solution. In concentrated sulphuric acid it yields a grayish mauve solution which on addition of formaldehyde turns browner and on addition of a little sodium nitrite remains unaffected.

Example II 8.5 parts of methyl benzanthrone, melting point 199° C., prepared from β-methyl-anthraquinone, are dissolved with stirring in 170 parts of sulphuric acid of 66° Bé. 10.2 parts of ferrous sulphate crystals are now added, followed, after cooling, by the gradual addition of 6.4 parts of hydroxylamine hydrochloride. The whole is now heated to 150° C. and maintained at this temperature for 4 hours. Afterwards it is cooled and poured into 565 parts of ice and water, the whole being then stirred for one hour. The precipitated product is separated by filtration, extracted twice with 1000 parts of boiling water and dried.

11.1 parts of the dried residue are gradually added at 180° C. to 110 parts of stirred molten caustic potash. The temperature is slowly raised to 240° C. The melt is maintained at 240° C. for 2 hours. The cooled melt is extracted with 1000 parts of water, heated to boiling and oxidized with a current of air. The dyestuff is filtered off and washed with water. Finally it is boiled with dilute hydrochloric acid, filtered, washed free from acid and dried. It dyes cotton from a hydrosulphite vat in grey to black shades.

What we claim and desire to secure by Letters Patent is:—

1. In the manufacture of new vat dyes, the process which comprises condensing an unsulphonated benzanthrone with a hydroxylamine compound of the class consisting of hydroxylamine and salts of hydroxylamine, fusing the condensation product with alkali and recovering the vat dye thus obtained.

2. In the manufacture of new vat dyes, the process which comprises condensing an unsulphonated benzanthrone with a salt of hydroxylamine, fusing the condensation product with alkali and recovering the vat dye thus obtained.

3. In the manufacture of new vat dyes, the process which comprises condensing benzanthrone with a salt of hydroxylamine, fusing the condensation product with alkali and recovering the vat dye thus obtained.

4. In the manufacture of new vat dyes, the process which comprises condensing benzanthrone with a salt of hydroxylamine in the presence of ferrous sulphate, fusing the condensation product with alkali and recovering the vat dye thus obtained.

5. In the manufacture of new vat dyes, the process which comprises condensing benzanthrone with hydroxylamine hydrochloride in the presence of ferrous sulphate, fusing the condensation product with caustic potash and recovering the vat dye thus obtained.

6. As a new article of manufacture, the product obtained by the condensation of unsulphonated benzanthrones with a hydroxylamine compound of the class consisting of hydroxylamine and salts of hydroxylamine, followed by alkaline fusion of the compound so obtained, this product being a vat dye, which with pyridine gives a bluish violet to bluish green solution, which dissolves in concentrated acid giving a grayish mauve color which color becomes browner on addition of formaldehyde and is unaffected by the addition of a little sodium nitrite and which dyes cotton from a hydrosulphite vat in gray to black shades.

7. As a new article of manufacture the vat dye obtainable according to claim 5, the said vat dye being a black powder, soluble in pyridine to a bluish green solution, soluble in concentrated sulphuric acid to a grayish mauve solution which on addition of formaldehyde becomes browner and is not affected by the addition of a small quantity of sodium nitrite and which dyes cotton from a hydrosulphite black bluish gray to bluish black shades.

8. The process of claim 1 in which the hydroxylamine compound is hydroxylamine.

9. In the manufacture of new dyes, the process which comprises condensing an unsulphonated benzanthrone compound of the class consisting of benzanthrone and alkylbenzanthrone with a hydroxylamine compound of the class consisting of hydroxylamine and hydroxylamine hydrochloride, said condensation being effected in the presence of sulphuric acid, fusing the product thus obtained with caustic potash and recovering the dye thus produced.

10. The process of claim 9 in which the unsulphonated benzanthrone compound is methylbenzanthrone.

11. In the manufacture of new dyes, the process which comprises dissolving an unsulphonated benzanthrone compound of the class consisting of benzanthrone and methylbenzanthrone, in sulphuric acid of 66° Bé. strength, gradually adding hydroxylamine hydrochloride to the mixture, heating said mixture to effect reaction between said benzanthrone compound and the hydroxylamine compound, pouring the reaction mixture thus obtained into a mixture of ice and water, and then isolating, purifying and drying the reaction product thus obtained, fusing the dried reaction product with caustic potash, cooling the melt and extracting with water, oxidizing the aqueous solution thus obtained with a current of air, and then isolating, purifying and drying the precipitated dyestuff thus obtained.

12. The process of claim 11 in which the unsulphonated benzanthrone compound is benzanthrone.

13. The process of claim 11 in which the unsulphonated benzanthrone compound is methylbenzanthrone.

14. As a new article of manufacture the vat dye obtainable from methylbenzanthrone according to the process of claim 11, the said vat dyestuff dyeing cotton from the hydrosulphite vat in gray to black shades.

In testimony whereof we affix our signatures.

ARNOLD SHEPHERDSON.
SIDNEY THORNLEY.